(12) United States Patent
Selitser et al.

(10) Patent No.: US 8,296,464 B2
(45) Date of Patent: Oct. 23, 2012

(54) SYSTEM AND METHOD FOR PROVIDING A SPLIT DEPLOYMENT MODEL FOR A TELECOMMUNICATION SERVICE ACCESS GATEWAY

(75) Inventors: Boris Selitser, Castro Valley, CA (US); Andreas Jansson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 656 days.

(21) Appl. No.: 12/491,850

(22) Filed: Jun. 25, 2009

(65) Prior Publication Data

US 2010/0332684 A1 Dec. 30, 2010

(51) Int. Cl.
*G06F 15/16* (2006.01)
(52) U.S. Cl. ...................................................... 709/250
(58) Field of Classification Search .................. 709/223, 709/224, 250; 455/466
See application file for complete search history.

(56) References Cited

U.S. PATENT DOCUMENTS

| 7,702,739 B1 * | 4/2010 | Cheng et al. ................... 709/207 |
| 2008/0091837 A1 * | 4/2008 | Langen et al. ................. 709/230 |
| 2009/0007098 A1 * | 1/2009 | Chevrette et al. .............. 717/177 |

* cited by examiner

*Primary Examiner* — Joseph Avellino
*Assistant Examiner* — Marshall McLeod
(74) *Attorney, Agent, or Firm* — Fliesler Meyer LLP

(57) ABSTRACT

A split deployment model is enabled for a telecommunication service access gateway. The services of the gateway are segregated into a set of core services that provide container-based functionality and a set of exposure services that enable network integration and translation of protocols. The core services are executed as part of the application server, while the exposure services are deployed in separate archive files. This isolation of services allows single or groups of services to be independently upgraded, patched or removed and reduces the impact of one service on others. Furthermore, the services can scale independently, allowing additional hardware resources to be added to a particular service. Multiple versions of a single service can also be deployed in a single cluster or server.

20 Claims, 5 Drawing Sheets

SYSTEM AND METHOD FOR PROVIDING A SPLIT DEPLOYMENT MODEL FOR A TELECOMMUNICATION SERVICE ACCESS GATEWAY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunications and software deployment models and more particularly to providing an improved split deployment model for a telecommunication service access gateway.

BACKGROUND

Given the recent dramatic growth in wireless and cellular communications, more and more businesses and other entities are integrating themselves with mobile device technologies. In addition to standard voice features, modern cellular phones and similar devices provide countless other services, such as internet access, email, short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new and retain customers, develop profitable new business models, improve returns and launch new services as quickly as possible. In addition, the possible competitive pressures from other entities such as internet-based providers have been a growing area of concern in this field.

Faced with these challenges, most operators expect a drastic increase in their portfolio of content and application offerings, from a handful now, to thousands and possibly even millions in the future. While some of these offerings will be developed and deployed in house, the vast majority of these new applications will likely be sourced from partners, Web applications such as social networking sites and third party service providers. These outsourced services will be deployed and executed outside of the carrier's internal network, thereby creating new challenges in security, integration and management of the environment.

To assist with these challenges, new telecommunication gateways and software applications have emerged, which are typically deployed by the network operator as part of a service development platform (SDP). These gateways usually provide features for managing the ecosystem between the operator, its internal subscriber network and various third party providers. For example, a communication services gateway may help to secure third party access to the operator's core network, provide service level agreement (SLA) enforcement, as well as perform numerous other functions.

While such gateways have done much to improve the telecommunication service environment, there still exists significant room for advancement in terms of modularity, scalability and ease of management. For example, the ability to flexibly upgrade or selectively scale various portions of a gateway would be desirable. Additionally, reducing the impact of one gateway component to others would provide some advantages in certain situations. Applicants have identified the foregoing as well as other needs that currently exist in the art in coming to conceive the subject matter of the present disclosure.

SUMMARY OF THE INVENTION

A split deployment model is described for a telecommunications gateway. The services of the gateway are segregated into a set of core services that provide container-based functionality and a set of exposure services that enable network integration and translation of protocols. The core services are executed as part of the application server, while the exposure services are deployed in separate archive files. This isolation of services allows single or groups of services to be independently upgraded, patched or removed and reduces the impact of one service on others. Furthermore, the services can scale independently, allowing additional hardware resources to be added to a particular service. Multiple versions of a single service can also be deployed in a single cluster or server.

DETAILED DESCRIPTION

Figure 1:
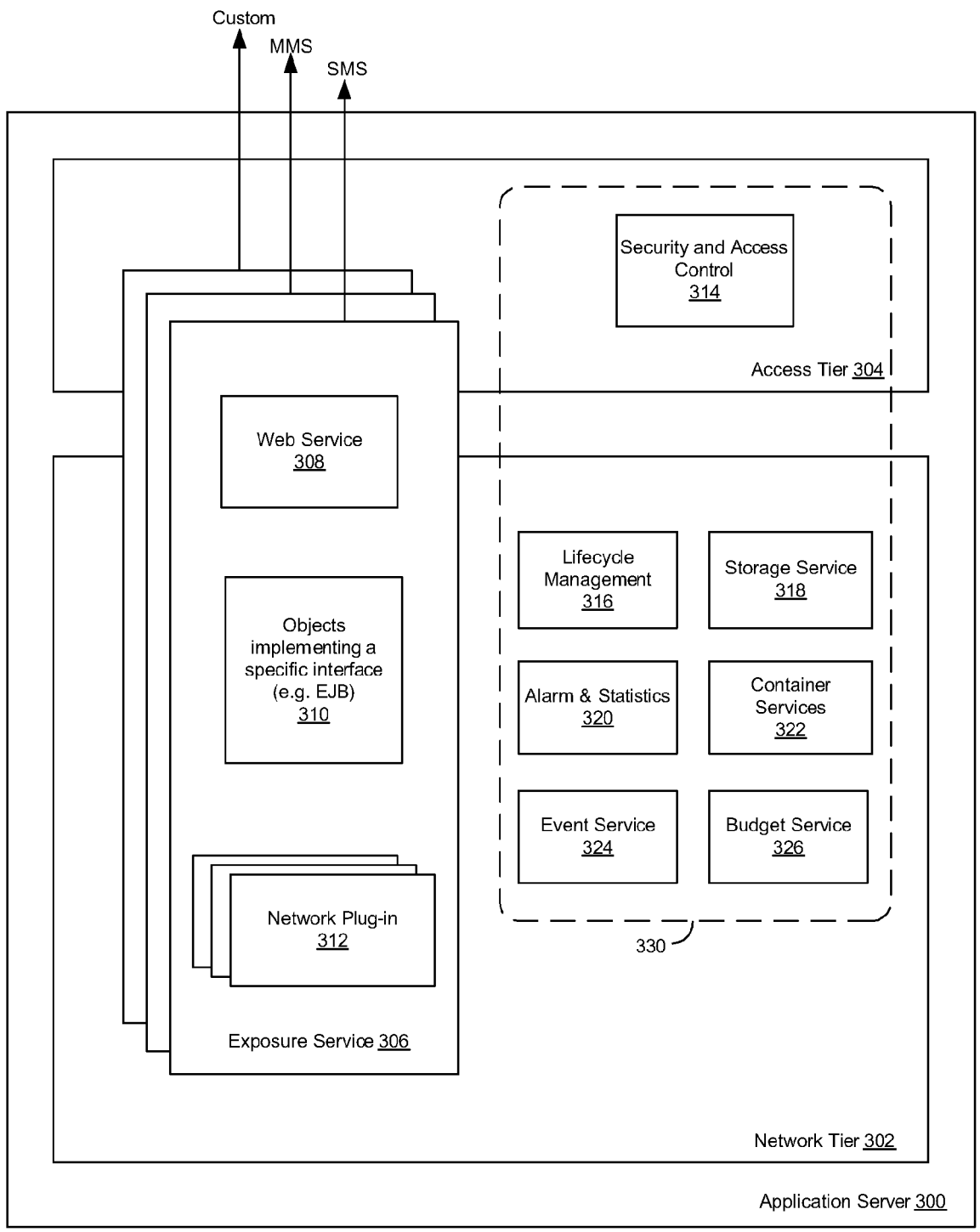
FIG. 1 is an illustration of the split deployment model implemented in the telecommunication service access gateway, in accordance with various embodiments of the invention.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a server or a router. Furthermore, it can also be apparent to those skilled in the art that such components, regardless of how they are combined or divided, can execute on the same computing device or can be distributed among different computing devices connected by one or more networks or other suitable communication means.

In accordance with the embodiments of the invention, systems and methods are described for providing an improved split deployment model for a telecommunication service access gateway. As part of the deployment model, the core gateway services running as part of the application server kernel are deployed in separate archive files from the exposure services hosted on the gateway. The core services provide container-based functionality, while the exposure services enable integration into the internal telecommunications network of the operator. In various embodiments, the split deployment model allows a single exposure service or groups of exposure services to be patched, upgraded, installed and removed independently, without impacting others. Furthermore, each archive file is reduced in size, making it easier to manage. The various services are effectively isolated and have a smaller chance of impacting each other. This also allows the exposure services to be selectively deployed on the designated servers.

Additionally, this isolation allows each service to scale independently from the others. Thus, if desired, more processing hardware and resources can be allocated for a particular service than other services. As an illustration, the network operator may choose to allocate more servers or CPUs to the short messaging service (SMS) exposure service and a fewer number of servers to the less popular services.

In the various embodiments, the exposure services perform network integration and translation functions for enabling external service provider applications to access the internal network of the telecommunications operator. As an illustration, one exposure service may allow an external third party application to access the subscriber network of the operator via some Web Services protocol and provide the translation of the Web Services into the proprietary network protocol of the operator. The core services, on the other hand, provide the internal container-based functionality within the gateway, such as event broadcasting, state information storage, configuration, statistics, policy enforcement and the like. By clearly separating the deployment of the two types of services into separate archive files, the gateway becomes more modularized, enabling many advantages, as described throughout this disclosure.

As used throughout this disclosure an archive file can be any file that aggregates one or more other files needed to implement a particular service or function, as well as various metadata regarding the contents therein. For example, the archive file may include metadata regarding the file directory structure, security information, error/recovery information, size/volume information, description and comments, and the like. As one possible illustration, the archive file can be an Enterprise ARchive (EAR) file defined by the Java Enterprise Edition (JEE) available from Sun Microsystems Inc. However, it is noted that the invention described herein is not limited to JEE, nor any other particular format of archive files.

In one embodiment, the core platform (server) services of the gateway are loaded along with the application server in one or more archive files. In addition, each exposure service is packaged into two separate archive files—the access tier archive file and the network tier archive file. Each of these files can contain a collection of exposure services that has common application facing APIs. For example, one archive file can include ParlayX SMS+Binary SMS Web Services and SMPP+Parlay MMM plug-ins.

During initial deployment, a configuration file can be used to define which core services should be started on a particular server or cluster. For example, a custom resource tag can be included within the configuration, to specify which services are started and the particular order in which they start. In one embodiment, a bootstrap service is the first service of the gateway to be executed, and this bootstrap service starts each of the core platform services one after the other, as defined in the configuration file. The core services are generally deployed in the network tier of the service access gateway. In certain embodiments, an initial setup service can also be deployed on the access tier. The core services can also be shared between the archive files containing the exposure services. In addition, the exposure services may share data.

Once the core services have been deployed and running, the exposure services can be independently upgraded or patched without the need to restart the server. This allows hitless upgrading of various exposure services by deploying a new version of the exposure service alongside the older version and routing the new incoming requests to the newer version. Once the older version has finished its in-flight processing, it can be retired and un-deployed. In order to upgrade or modify the core services, on the other hand, a rolling upgrade process is used, which involves shutting down one managed server at a time, applying the patched files (changes) and restarting the server.

The split deployment model and the communications gateway will now be described in more detail along with the illustrated figures. It should be noted, however, that the figures are provided for purposes of illustration and that not all of the details illustrated in these figures are required or necessary for the invention.

FIG. 1 is an illustration of the split deployment model implemented in the telecommunication service access gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the service access gateway can be deployed on an application server 300 in two tiers—an access tier 304 and a network tier 302. The access tier can include various security and access control features 314 and the network tier can host most or all of the gateway services. The various gateway services can be conceptually divided into a set of core services 330 and a set of exposure services 306. The core services 330 can provide internal container-based functionality, such as event gathering 324, data storage 318, lifecycle management 316, alarms and statistics 320, budget policy enforcement 326 and other container services 322. In general, a core service is a gateway-specific service that executes in the same class loader as the application server on which the gateway is deployed. In other words, the core services are those services which run as part of the application server kernel. The table below illustrates a non-exhaustive list of some possible gateway core services:

| Core Service | Brief Description |
| --- | --- |
| Budget Service | Cluster wide policy enforcement service |
| Geo-Redundant Service | Geographically redundant service level agreement enforcement service |
| Event Channel | A service that can broadcast arbitrary events between modules and servers in the cluster |
| Resource Manager | Plug-in and service interceptor management service |
| Storage Service | A database-backed cache provider for transient data and optimized provider for direct database access. |
| Configuration Service | Persistent store for platform configuration data |
| EDR service | A service that provides event data records, charging data records and alarms |
| Statistics Service | A service that enables exposure services to query statistical information |
| SNMP Service | A service that emits simple network management protocol (SNMP) events |
| Policy Service | A service that evaluates rules for policy decision acts as PDP to enforce service level agreements. |
| Session Management | Manages sessionful (stateful) application interactions with the platform |
| SIP Services | Session initiation protocol (SIP) service in Java Enterprise Edition (JEE) container |
| Service Interceptors | External policy (ilog, xacml), POJO, workflow integration with exposure service flow |
| Callable Policy | Policy PDP service for trusted policy enforcement points |
| Account Service | Manages service provider and application accounts and roles |
| CORBA Service | Enables use of CORBA for connectivity |

The exposure services 306, on the other hand, are the modules that are needed to implement the traffic flow between a specific web service to a network element of the operator. As such, the exposure service can be thought of as a traffic path module that enables communication between an external application (or client) and the internal subscriber network. Some examples of exposure services include, but are not limited to: short messaging service (SMS), multimedia messaging service (MMS), terminal location, $3^{rd}$ party call, call notification, audio call, presence, subscriber profile and WAP push. As illustrated, the each exposure service includes a web service interface 308, an object implementing a specific interface (e.g. Enterprise Java Bean EJB) 310, and a network-specific plug-in 312. The plug-in can be thought of as an adapter that enables the exposure service to access the specific internal and proprietary network protocol (e.g. Parlay 5.0, Ericsson MM7 R1.0/2.0/2.5, etc.). The exposure service can thus expose the proprietary network protocol as an MMS web service, for example, so that third party applications (residing outside of the operator's network) can access the desired functionality within the telecom network.

In one embodiment, the core services are deployed as one or more archive files upon loading the gateway on the application server. Each exposure service is deployed as two archive files. This separation allows the various exposure services to be added, removed or modified without having to restart the server. For example, a new version of the exposure service can be deployed alongside the older version. New incoming requests can be routed to the new version while in-flight requests and requests associated with existing sessions are handled by the previous version. Once the older version finishes its processing, it can be safely undeployed, without causing any disruption to the traffic flowing through the gateway.

Figure 2:
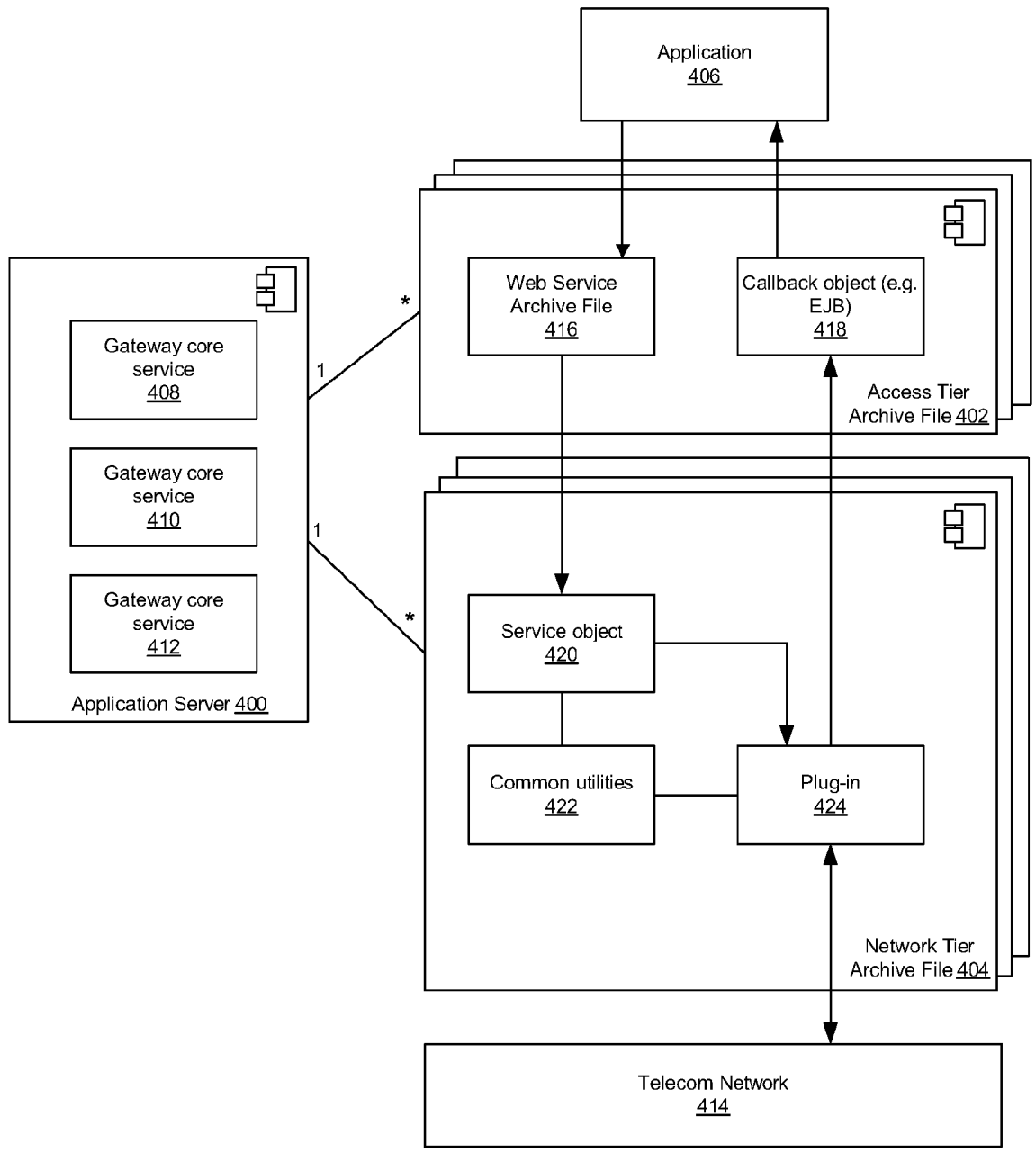
FIG. 2 is another illustration of the split deployment model implemented in the telecommunication service access gateway, in accordance with various embodiments of the invention.

FIG. 2 is another illustration of the split deployment model implemented in the telecommunication service access gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The illustration in FIG. 2 shows the archive files of the gateway. As illustrated, the core services 408, 410, 412 are running in the application server 400 (same class loader). Furthermore, there can be multiple instances of the access tier archive files 402 and the network tier archive files 404.

An access tier archive file can include such components as the web service web archive file (WAR) 416 and a callback object 428 (e.g. EJB). A network tier archive file can include service objects 420, common utilities 422 and a plug-in 424. The combination of the access tier archive file and the network tier archive file comprise an exposure service that enables traffic flow between external applications 406 and the telecom network 414.

Figure 3:
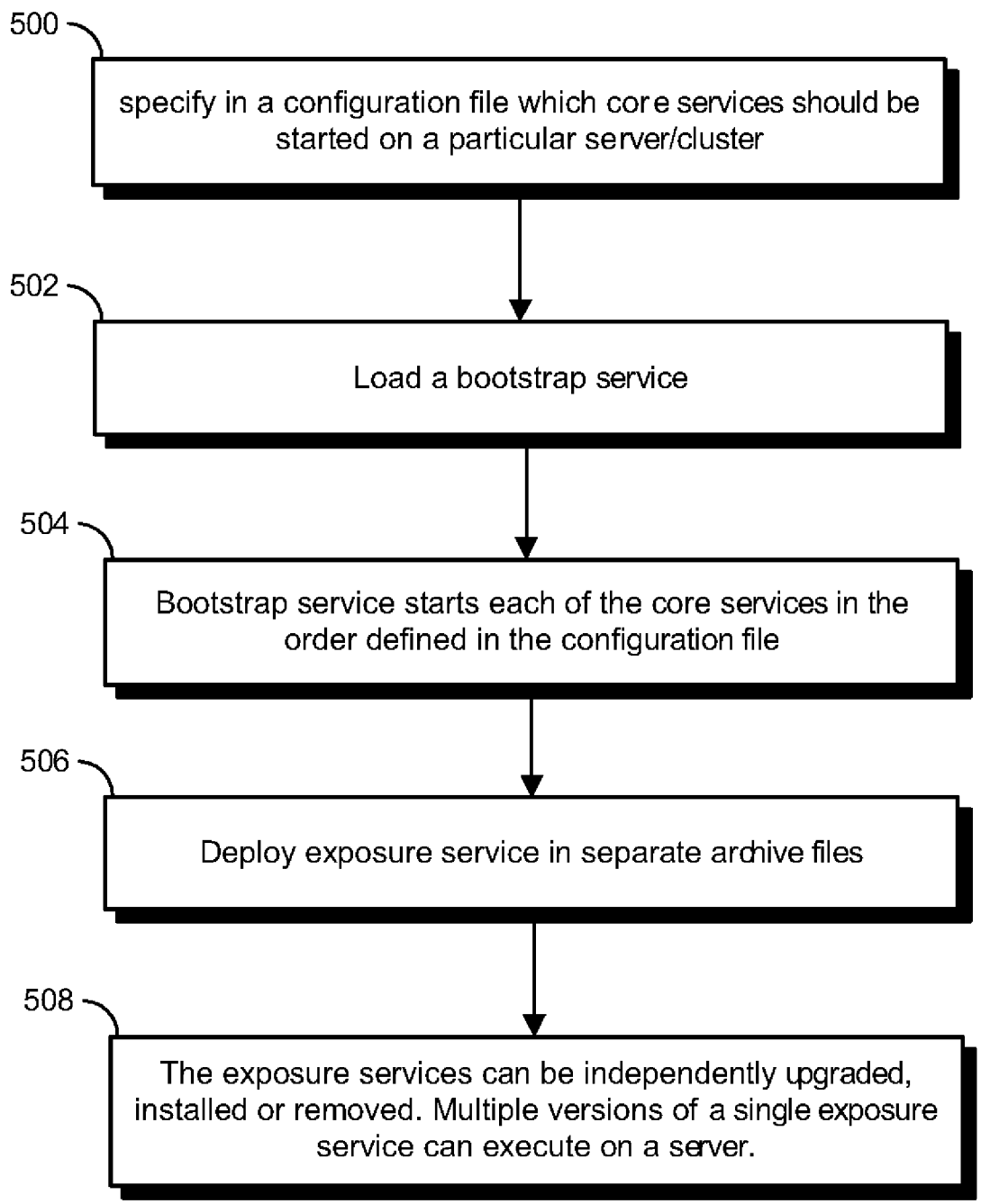
FIG. 3 is a flow chart diagram of a process for deploying the gateway core and exposure services, in accordance with various embodiments of the invention.

FIG. 3 is a flow chart diagram of a process for deploying the gateway core and exposure services, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 500, a configuration file can be used to specify what core services should be started on a particular server and/or cluster. The configuration information can also specify what order the core services will start in. The configuration file can be an extensible markup language (XML) file.

In step 502, a bootstrap service can be loaded. The bootstrap service can be the first part of the gateway application that gets executed. In one embodiment, it is implemented as a gateway core service that is started late in the application server lifecycle but before any applications are deployed. In step 504, the bootstrap service starts each of the core platform services, one after the other. Which services are started and the order they start can be defined by the XML configuration file, as described above.

In step 506, the exposure services are deployed in a set of separate archive files. This allows single or groups of exposure services to be patched, upgraded, installed or removed independently without impacting others (step 508). Additionally, the exposure services can be selectively deployed in specific servers, they can be scaled independently, and multiple versions of a single exposure services can be contemporaneously executing on a single server or cluster. This isolation of services can enable a more modularized gateway deployment, thereby providing various advantages as described herein.

Gateway

Figure 4:
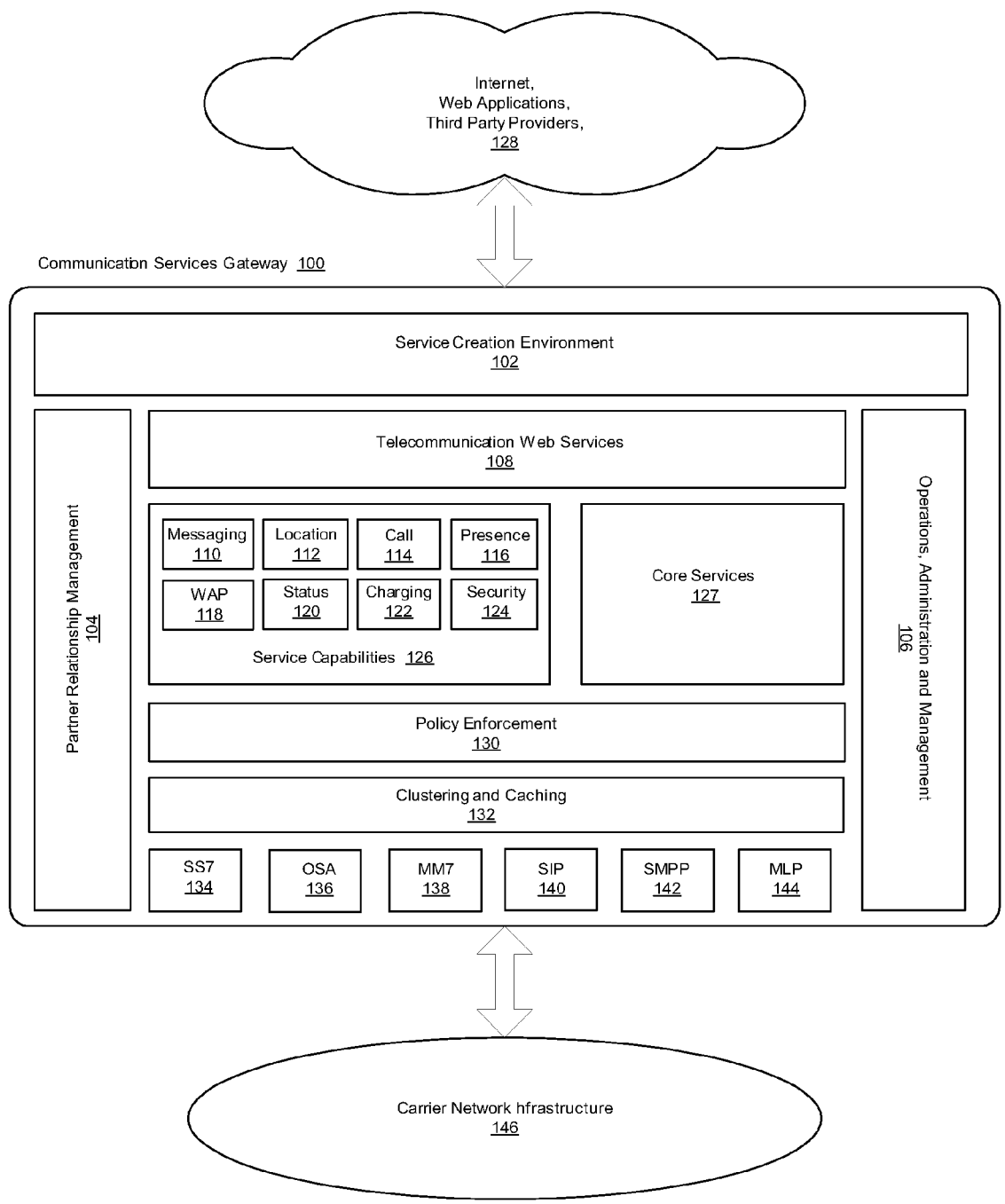
FIG. 4 is an illustration of general functionality of the gateway that can implement the split deployment model, in accordance with various embodiments of the invention.

FIG. 4 is an illustration of general functionality of the gateway that can implement the split deployment model, in accordance with various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communications gateway 100 can be deployed by a network operator in order to manage traffic flow to and from the telecommunications network 146. In other words, the gateway is an entity deployed between the internal network of the operator and any client and/or device 128 that wishes to access the network 146. In one embodiment, the communication services gateway is a set of software applications that perform some services to the requests flowing to/from the network 146. In alternative embodiments, the gateway can be implemented as hardware, firmware, or any combination thereof. In either case, the gateway can translate communications initiated by clients (e.g. Web applications) via Web services into the appropriate network protocols and vice versa. For example, via the exposure services, the communication services gateway can expose the following service enablers as telecommunication Web Services 108:

Call Control 114 (Parlay X), including Third-party call control, call notification and audio call;

Messaging 110 (Parlay X), including short messaging service (SMS), multimedia messaging service (MMS) and wireless application protocol (WAP) push;

Location 112 (Parlay X), including MLP-based terminal location;

Presence (Parlay X), including session initiation protocol (SIP)-based terminal status; and Subscriber Profile—lightweight directory access protocol (LDAP)-based user profile.

On the carrier network side, the web services can be translated into protocols such as signaling system 7 (SS7) 134, MM7 138, session initiation protocol (SIP) 140, short message peer to peer protocol (SMPP) 142, MLP 144, and the like.

The various features of the gateway can also include clustering and caching 132, as well as geographical redundancy across multiple domains. For example, the gateway can be deployed in a multi-tier environment that comprises an access tier and a network tier. The multi-tier deployment will be described in further detail below, in conjunction with FIG. 5. In addition, the gateway can provide various service capabilities 126, such as messaging 110, location 112, call 114, presence 116, wireless application protocol (WAP) 118, status 120, charging 122 and security 124.

In some embodiments, the core platform services 127 of the gateway can include alarms, caching, call detail records (CDR), charging, budget, accounts, events, geo-redundancy, logging, policy, resource, statistics, storage, timer and transactions. In addition, the service creation environment 102 can provide web and application developers, system administrators and service providers with a set of service creation, simulation and testing capabilities. The service creation suite 102 can comprise a software development kit (SDK) that can be used to rapidly create new services, as well as to customize and extend the platform to meet the unique requirements of the particular telecom network.

It is noted, however, that the above described features and services of the communication services gateway are provided purely for purposes of illustration and are not intended to be limiting of the invention in any way. The particular set of features illustrated in FIG. 4 is only one example of many such sets that are possible and the communication services gateway is not limited to this or other specific implementations. Furthermore, while the split deployment capability can be implemented with the gateway described above, it is also possible to use the split deployment model with other types of gateways and other types of entities in order to gain the advantages described herein.

Figure 5:
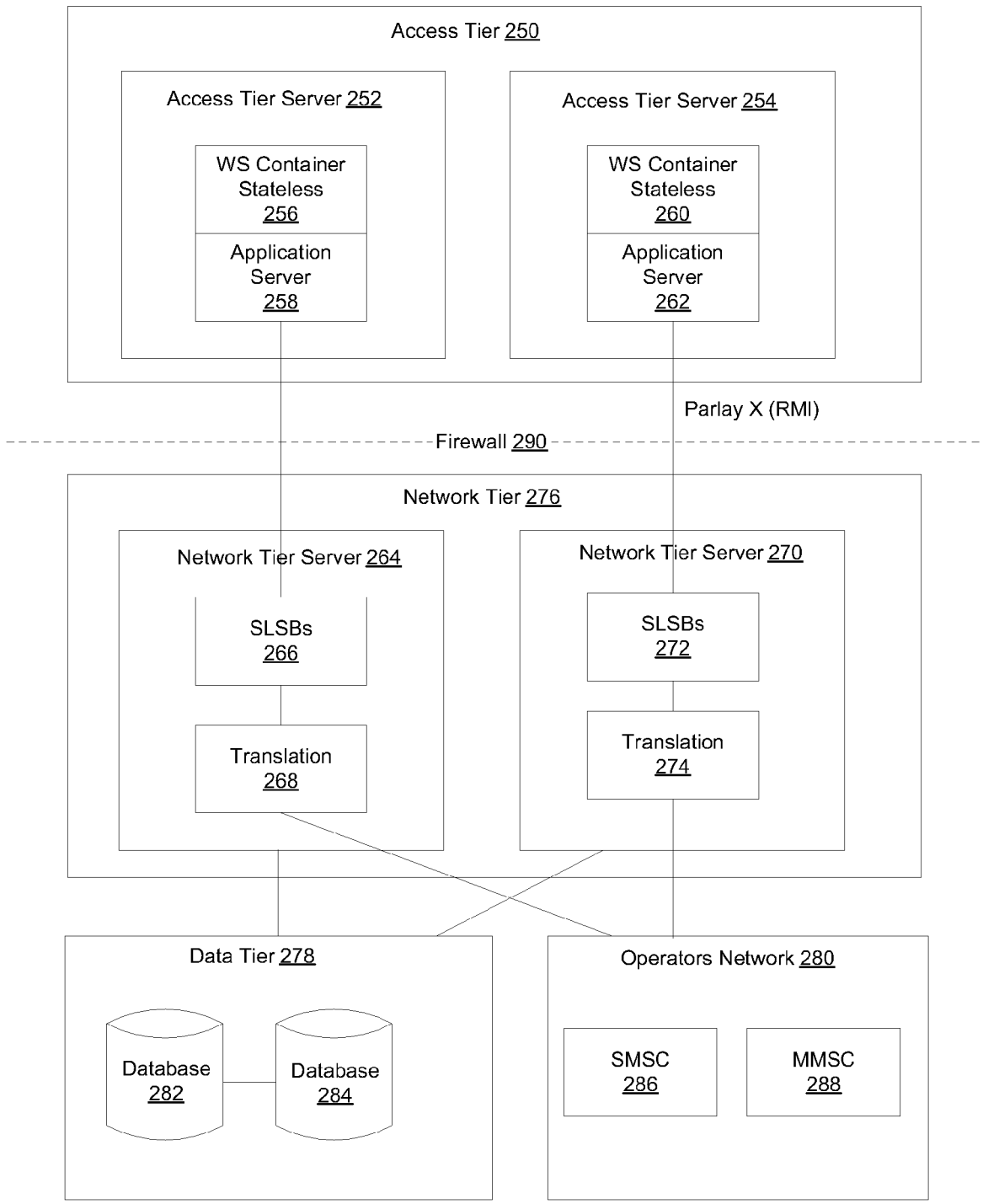
FIG. 5 is an illustration of a possible dual-tier deployment of the communications gateway, in accordance with various embodiments of the invention.

FIG. 5 is an illustration of a possible dual-tier deployment of the communications gateway, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the communication services gateway can be deployed in two tiers—an access layer cluster and a network layer cluster having a firewall 290 in between. The access tier 250 is the entry point for third party applications into the operator's network. The purpose of the access tier is to provide a first level of protection from malicious applications and other potential threats against the integrity of the operator's network. In one embodiment, the access tier can be distributed across multiple access tier servers 252, 254 having an application server software 258, 262 deployed thereon. The web services stateless container 256, 260 can be implemented on top of the application server, allowing the access tier to receive requests into the access tier.

The network tier 276, which integrates with the operator's network, is shielded from applications by the access tier 250. The communications between the access tier and the network tier can be over the Parlay X Web Services as remote method invocations (RMI). The network tier can be comprised of multiple network tier servers 264, 270. In one embodiment, stateless session beans (SLSBs) 266, 272 can be deployed on the network tier servers. In addition, the network tier can include the translation logic components 268, 274, for translating the communications into specific network protocols, as previously described.

Each tier can be scaled individually by adding new servers. In one embodiment, each server in each tier is running in an active mode. The deployment can additionally include a data tier 278 with databases 282, 284 or some other forms of persistent storage. Furthermore, the operator's network 280 typically provides a short messaging service center (SMSC) 286 and a multimedia messaging service center (MMSC) 288 to the various subscribers. The SMS center 286 and the MMS center 288 are responsible for handling the SMS operations and the MMS operations (respectively) of a wireless network. For example, when an SMS message is transmitted by a mobile phone, it reaches the SMS center 288, which can then forward the message to the recipient. In various embodiments, the main duties of the SMSC and the MMSC are to route various messages and to regulate the process.

In various aspects, the embodiments described throughout this disclosure encompass computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments also include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing a split deployment model for a telecommunication service access gateway, said system comprising:
   one or more processors;
   a set of core platform services of a gateway executing on the one or more processors, wherein the set of core platform services provide container-based functionality, wherein the set of core platform services are deployed as one or more archive files along with the application server;
   a set of exposure services hosted on said gateway that provide network protocol translation functionality, wherein the set of exposure services are packaged and deployed as one or more archive files separately from the set of core platform services;
   a configuration file that specifies a plurality of core platform services from the set of core platform services which are to be started, and an order in which the plurality of core platform services are to be started; and
   a bootstrap service which starts the plurality of core platform services in the order specified in the configuration file.

2. The system of claim 1, wherein each of the set of exposure services is scaled independently from one another to enable separate hardware to be added independently to each exposure service.

3. The system of claim 1, wherein the set of core platform services are isolated from one another in order to be generically applicable to the set of exposure services.

4. The system of claim 1, wherein the functionality of each of the set of exposure services are isolated from one another.

5. The system of claim 1, wherein each of the set of exposure services is selectively deployed on a particular server within a computer network cluster.

6. The system of claim 1, wherein each of the set of exposure services is patched, upgraded, installed and removed independently from each other, without impacting any other exposure service.

7. The system of claim 1, wherein the split deployment model enables two or more versions of an exposure service to be executing contemporaneously on the gateway.

8. The system of claim 1, wherein each exposure service is packaged as an access tier file and a network tier file.

9. The system of claim 1, wherein the set of core platform services is upgraded by shutting down one managed server at a time, applying a patch file and restarting the server.

10. The system of claim 1, wherein said core platform services further include one or more of the following:
    an event channel service that broadcasts events between modules and servers in a cluster;
    a storage service that stores data;
    a configuration service that persists configuration information;
    an event data records (EDR) service that broadcasts charging data records, event data records and alarms;
    a statistics service that generates statistics for the gateway;
    a geographical redundancy service that supports failover and service level agreement enforcement across multiple geographical domains;
    a budget service that provides cluster-wide policy enforcement; and
    a resource manager that manages plug-ins and interceptors.

11. The system of claim 1, wherein said exposure services further include one or more of the following:
    a short messaging (SMS) service;

a multimedia messaging (MMS) service;
a terminal location service;
a third party call service;
a call notification service;
an audio call service;
a presence service;
a subscriber profile service; and
a WAP push service.

12. A method for providing a split deployment model a telecommunication service access gateway, said method comprising:
- deploying a set of core platform services of the telecommunication service access gateway as one or more archive files, wherein the telecommunication service access gateway executes on one or more processors;
- deploying a set of exposure services hosted by the telecommunication service access gateway as one or more archive files;
- providing a configuration file that specifies a plurality of core platform services from the set of core platform services which are to be started, and an order in which the plurality of core platform services are to be started;
- loading a bootstrap service which starts the plurality of core platform services in the order specified in the configuration file; and
- wherein the set of core platform services is isolated from one another in order to be generically applicable to the set of exposure services.

13. The method of claim 12, wherein each of the set of exposure services is scaled independently from one another to enable separate hardware to be added independently to each exposure service.

14. The method of claim 12, wherein the functionality of each of the set of exposure services are isolated from one another.

15. The method of claim 12, wherein each of the set of exposure services is selectively deployed on a particular server within a computer network cluster.

16. The method of claim 12, wherein each of the set of exposure services is patched, upgraded, installed and removed independently from each other, without impacting any other exposure service.

17. The method of claim 12, wherein the split deployment model enables two or more versions of an exposure service to be executing contemporaneously on the gateway.

18. The method of claim 12, wherein each exposure service is packaged into an access tier file and a network tier file.

19. The method of claim 12, wherein the set of core platform services is upgraded by shutting down one managed server at a time, applying a patch file and restarting the server.

20. A non-transitory computer-readable medium carrying one or more sequences of instructions for providing a split deployment model for a telecommunication service access gateway, which instructions, when executed by one or more processors, cause the one or more processors to carry out the steps of:
- deploying a set of core platform services of the telecommunication service access gateway as one or more archive files; and
- deploying a set of exposure services hosted by the telecommunication service access gateway as one or more archive files;
- providing a configuration file that specifies a plurality of core platform services from the set of core platform services which are to be started, and an order in which the plurality of core platform services are to be started;
- loading a bootstrap service which starts the plurality of core platform services in the order specified in the configuration file; and
- wherein the set of core platform services is isolated from one another in order to be generically applicable to the set of exposure services.

* * * * *

UNITED STATES PATENT AND TRADEMARK OFFICE
CERTIFICATE OF CORRECTION

PATENT NO. : 8,296,464 B2
APPLICATION NO. : 12/491850
DATED : October 23, 2012
INVENTOR(S) : Selitser et al.

It is certified that error appears in the above-identified patent and that said Letters Patent is hereby corrected as shown below:

On sheet 4 of 5, in figure 5, Reference Numeral 146, line 1, delete "hfrastructure" and insert -- infrastructure --, therefor.

On Sheet 5 of 5, in figure 5, line 11-15, delete "  " and insert -- 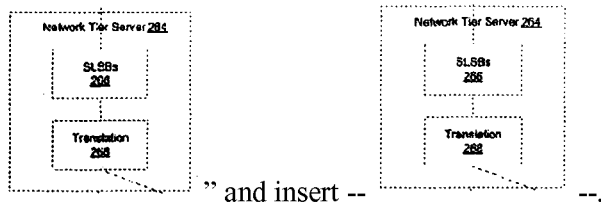 --, therefor.

In column 11, line 9, in Claim 12, after "model" insert -- for --.

Signed and Sealed this
First Day of January, 2013

David J. Kappos
*Director of the United States Patent and Trademark Office*